United States Patent Office.

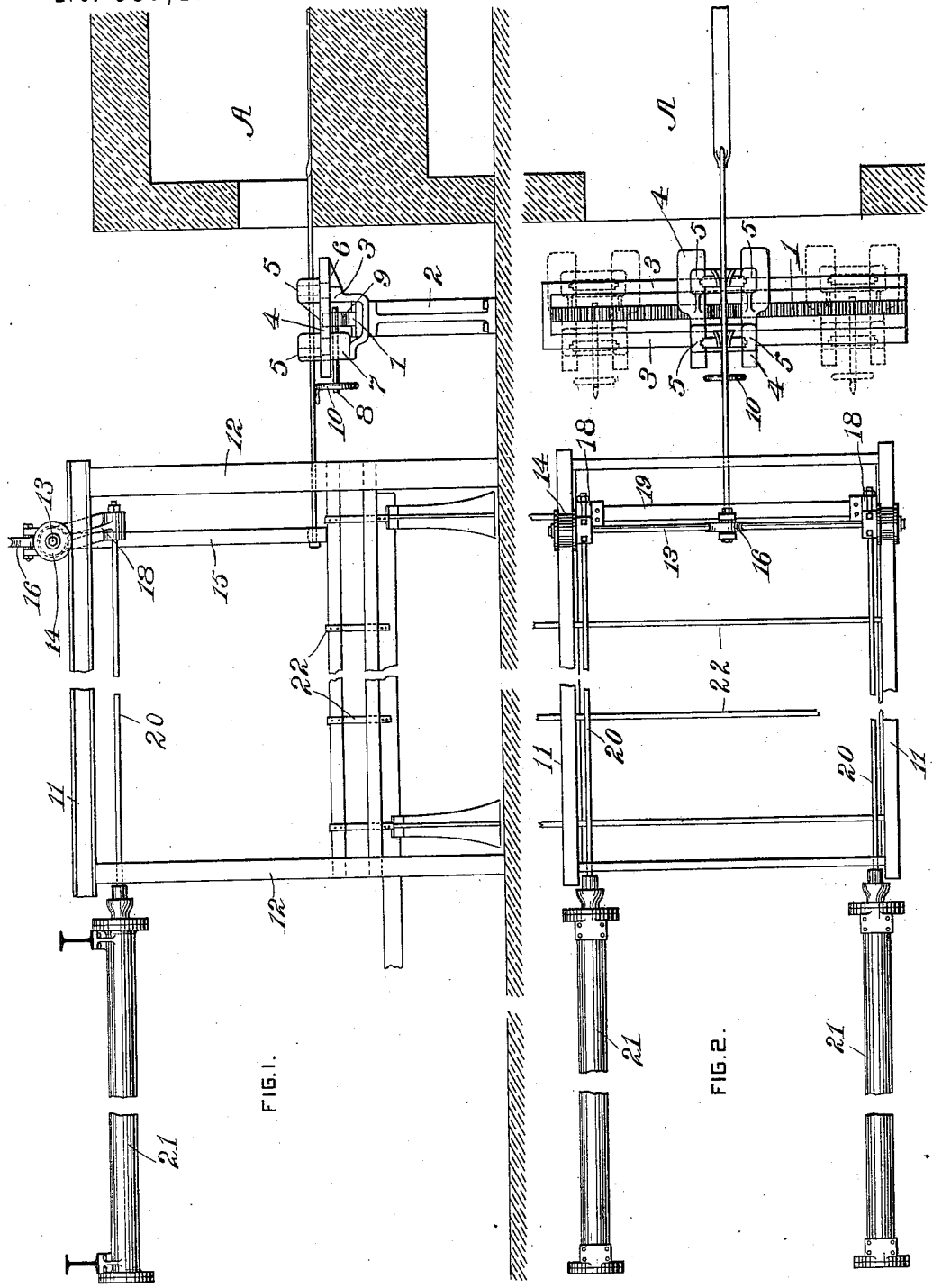

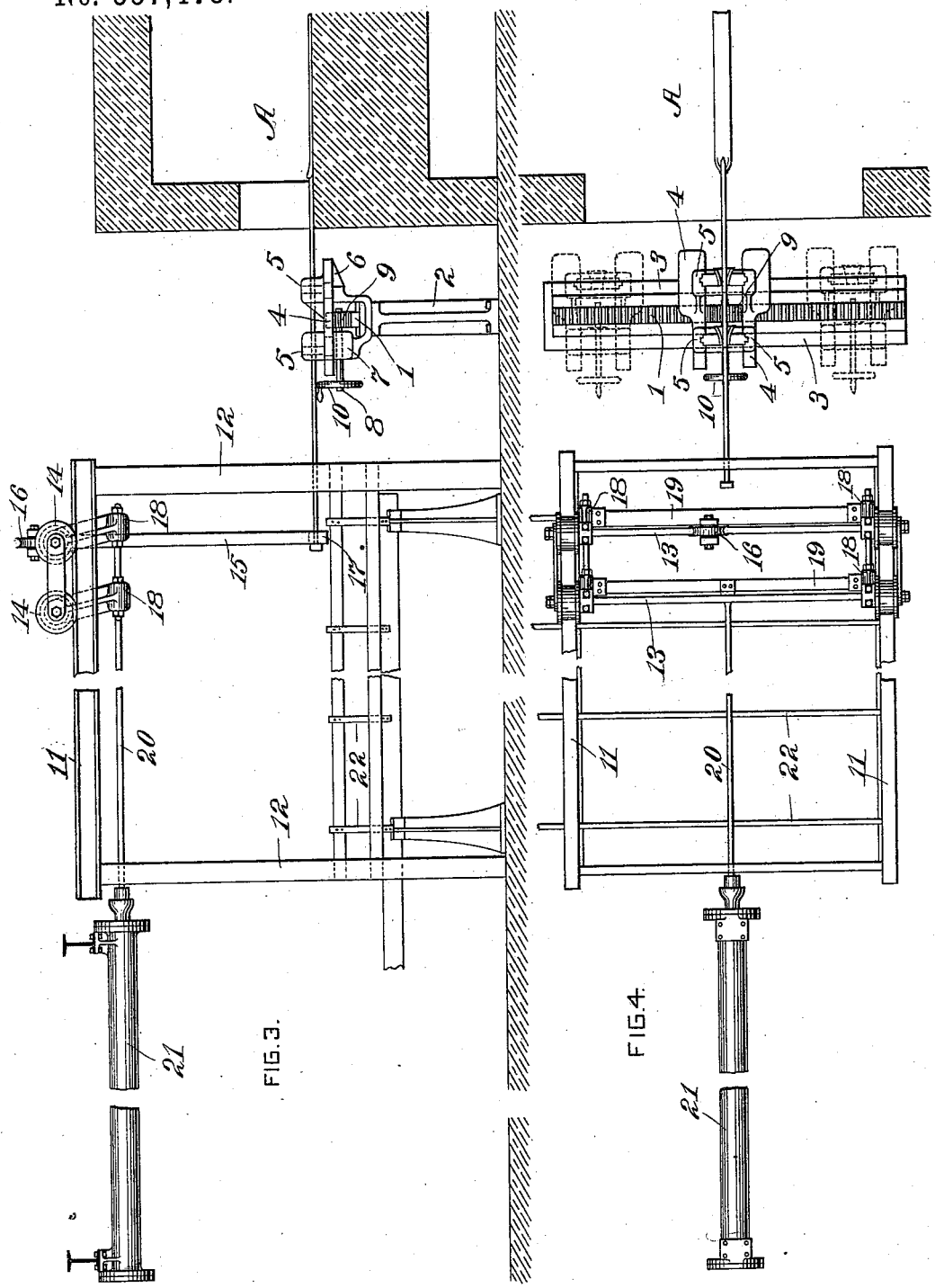

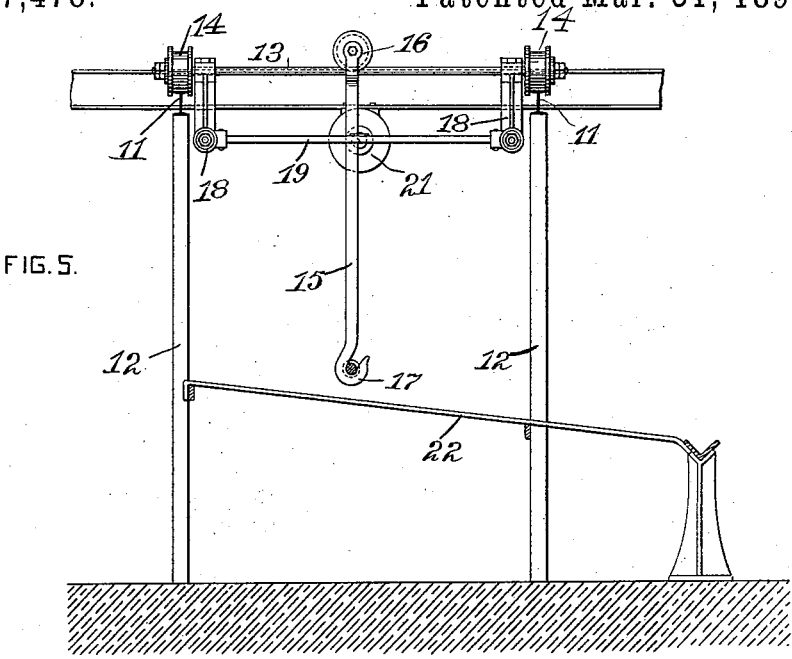

PETER BOYD, OF WHEELING, WEST VIRGINIA, ASSIGNOR TO THE RIVERSIDE IRON WORKS, OF SAME PLACE.

DRAW-BENCH FOR MANUFACTURING PIPE.

SPECIFICATION forming part of Letters Patent No. 557,478, dated March 31, 1896.

Application filed March 29, 1895. Serial No. 543,668. (No model.)

*To all whom it may concern:*

Be it known that I, PETER BOYD, a citizen of the United States, residing at Wheeling, in the county of Ohio and State of West Virginia, have invented or discovered certain new and useful Improvements in Draw-Benches for the Manufacture of Pipe, of which improvements the following is a specification.

The invention described herein relates to further or additional improvements in draw-benches for the manufacture of wrought-iron or steel pipe of the class or kind described and shown in application Serial No. 543,667, filed of even date herewith. In the construction set forth in said application provision is made for the lateral adjustment of a draw-bench having the welding die or bell and the draft mechanism mounted thereon.

The object of the present invention is to provide for a lateral adjustment of the welding bell or die and a laterally-adjustable device for connecting the pipe-tang or pipe-gripping tongs to a draft mechanism laterally stationary.

In the accompanying drawings, forming a part of this specification, Figures 1 and 2 are a side elevation and a plan view, respectively, of a draw-bench embodying my improvement. Figs. 3 and 4 are similar views of a modification of the construction shown in Figs. 1 and 2, and Fig. 5 is an end elevation of the bench shown in Figs. 3 and 4.

In the practice of my invention a rack-bar 1, preferably of a length a little greater than the opening in the furnace A through which the skelps are drawn for welding, is secured upon posts or standards 2 a short distance from the front wall of the furnace. Guide-bars 3, one on each side of the rack-bar, are also secured upon the posts or standards, and on the guide-bars is mounted a carriage 4, provided with one or two seats 5 for the welding die or bell. The carriage is provided at its front end with a shoulder or stop 6, adapted to bear against the front guide-bar and hold the carriage as against movement with the skelp when being drawn. A projection 7 is formed on the under side of the carriage at or near its rear end, and in the projection is formed a bearing for a short shaft 8, having a gear-wheel 9 keyed on its inner end for engagement with the rack-bar and provided on its outer end with a hand-wheel 10 for rotating the shaft and gear-wheel to adjust the carriage into line with the skelp to be drawn. Any other suitable form of mechanism can be employed for shifting the carriage.

In the rear of the stand for the welding die or bell I arrange two lines of rails 11, supported on posts 12, preferably of sufficient height to permit workmen to pass under the rails. A truck, consisting of the axle 13 and wheels 14, is mounted on the rails 12, and from the axle depends a hanger 15, which is forked at its upper end. The prongs of the fork passing on opposite sides of the axle are connected to the journal-pin of the grooved wheel 16, mounted on the axle. At its lower end the hanger is provided with a hook 17 or other suitable means for detachably connecting the pipe-tang or gripping-tongs to the hanger. Arms 18 are attached to the axle 13 inside of the wheels 14, and the lower ends of the arms are connected by a cross-bar 19 passing in front of the hanger. The arms 18 are connected to the ends of piston-rods 20 of the fluid-pressure cylinders 21, arranged at the rear end of the lines of rails 11, for shifting the truck back and forth.

In operating my improved plant, whether for bending or welding a skelp, the skelps are arranged in the furnace side by side, as is customary, and as soon as any of the skelps is sufficiently hot the die or bell carriage is shifted into line therewith, the bell slipped over the pipe-tang or gripping-tongs (which have been previously adjusted) and placed in the holder on the carriage. The hanger 15 is then shifted into position, the tang or tongs attached thereto and fluid pressure admitted to the cylinder.

Suitable studs 22 are arranged under the line of movement of the pipe to receive the same when drawn through the bell and freed from the hanger.

It will be readily understood by those skilled in the art that the skelps need not be shifted after being charged into the furnace, as the die or bell holder and the mechanism for connecting the skelp to the draft mechanism can be adjusted so that the line of draft will be in line with any one of the skelps.

As shown in Figs. 3 and 4, a single fluid-pressure cylinder and piston may be employed for shifting the truck back and forth, in which case it is preferred to construct the truck with two pair of flanged wheels, so as to insure a parallel movement along the rails.

I claim herein as my invention—

1. In an apparatus for welding or bending pipe, the combination of a heating-furnace, a die or bell holder adjustable along the front of the furnace, a draft mechanism stationary as against lateral movement and provided with laterally-adjustable mechanism for connection with the pipe-tang or gripping-tongs, whereby all the skelps may be drawn from the furnace without any material lateral movement, substantially as set forth.

2. In an apparatus for welding or bending pipe, the combination of a heating-furnace, a die or bell holder adjustable along the front of the furnace, lines of rails arranged at or approximately at right angles to the line of movement of the die or bell holder, a truck mounted on the rails, mechanism for connection with the pipe-tang, or pipe-gripping tongs adjustably mounted on the truck and mechanism moving the truck back and forth along the rails, substantially as set forth.

3. In an apparatus for bending or welding pipe, the combination of a heating-furnace, a die or bell holder adjustable along the front of the furnace, lines of rails arranged at or approximately at right angles to the line of movement of the die or bell holder, a truck mounted on the rails, mechanism for connection with the pipe-tang or pipe-gripping tongs laterally movable on the truck, and a fluid-pressure cylinder and piston for shifting the truck back and forth along the rails, substantially as set forth.

4. In a pipe bending or welding apparatus, the combination of a heating-furnace, a die or bell holder adjustable along the front of the furnace, elevated lines of rails arranged at or approximately at right angles to the line of movement of the die or bell holder, a truck mounted on the rails, mechanism for connection with the pipe-tang or pipe-gripping tongs laterally movable on the truck, means for moving the truck back and forth along the rails, and skids arranged under and at or approximately at right angles to the elevated rails, substantially as set forth.

5. In an apparatus for welding or bending pipe, the combination of a heating-furnace, a stand or support arranged in front of and approximately parallel with the furnace, a die or bell holder adjustably mounted on the stand or support, a draft mechanism stationary as against lateral movement and provided with laterally-adjustable means for connection with the pipe-tang or gripping-tongs, whereby all the skelps may be drawn from the furnace without any material lateral movement, substantially as set forth.

In testimony whereof I have hereunto set my hand.

PETER BOYD.

Witnesses:
DARWIN S. WOLCOTT,
F. E. GAITHER.